(12) United States Patent
Toyama et al.

(10) Patent No.: US 12,359,636 B2
(45) Date of Patent: Jul. 15, 2025

(54) INTERNAL-COMBUSTION ENGINE CONTROL DEVICE AND FILTER REGENERATION METHOD

(71) Applicant: Hitachi Astemo, Ltd., Hitachinaka (JP)

(72) Inventors: Yuichi Toyama, Hitachinaka (JP); Hiroshi Miyamoto, Hitachinaka (JP); Kazuya Saito, Hitachinaka (JP); Shinjiro Ishida, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/576,810

(22) PCT Filed: Jul. 5, 2022

(86) PCT No.: PCT/JP2022/026663
§ 371 (c)(1),
(2) Date: Jan. 5, 2024

(87) PCT Pub. No.: WO2023/282244
PCT Pub. Date: Jan. 12, 2023

(65) Prior Publication Data
US 2024/0309825 A1    Sep. 19, 2024

(30) Foreign Application Priority Data

Jul. 8, 2021    (JP) .................................. 2021-113428

(51) Int. Cl.
*F02D 41/02*    (2006.01)
*F01N 3/023*    (2006.01)
(Continued)

(52) U.S. Cl.
CPC ........... *F02D 41/029* (2013.01); *F01N 3/023* (2013.01); *F01N 9/002* (2013.01);
(Continued)

(58) Field of Classification Search
CPC .............. F02D 41/029; F02D 41/1446; F02D 41/1448; F02D 41/0245; F02D 41/025;
(Continued)

(56) References Cited

U.S. PATENT DOCUMENTS

2005/0022505 A1* 2/2005 Kitahara ............... F01N 3/0842
60/285
2007/0144146 A1* 6/2007 Kusatsugu ............. F01N 11/00
60/285
(Continued)

FOREIGN PATENT DOCUMENTS

JP    2010-25043 A    2/2010
JP    5621322 B2    11/2014
(Continued)

OTHER PUBLICATIONS

International Preliminary Report on Patentability (PCT/IB/326, PCT/IB/338 & PCT/IB/373) issued in PCT Application No. PCT/JP2022/026663 dated Jan. 18, 2024, including Japanese-language Written Opinion (PCT/ISA/237) with English translation (11 pages).
(Continued)

*Primary Examiner* — Matthew T Largi
(74) *Attorney, Agent, or Firm* — Crowell & Moring, LLP

(57) ABSTRACT

An internal-combustion engine control device and a filter regeneration method according to the present invention are used for an internal-combustion engine fueled by gasoline and including a filter that traps particulate matter in exhaust gas. When regeneration of the filter is required, fuel cut control for temporarily stopping supply of fuel to the internal-combustion engine is performed to burn off the particulate matter trapped in the filter, and the fuel cut control is repeated while performing exhaust temperature control for increasing the temperature of the exhaust gas of the internal-combustion engine. This makes it possible to prevent par-
(Continued)

ticulate matter (PM) from remaining unburned in a filter regeneration process.

3 Claims, 7 Drawing Sheets

(51) Int. Cl.
    *F01N 9/00*           (2006.01)
    *F02D 41/14*         (2006.01)

(52) U.S. Cl.
    CPC ...... *F02D 41/1446* (2013.01); *F01N 2560/08* (2013.01); *F01N 2900/1606* (2013.01); *F02D 2200/0812* (2013.01)

(58) Field of Classification Search
    CPC ............. F02D 41/1466; F02D 41/1467; F02D 2200/0812; F01N 3/023; F01N 9/002; F01N 2560/08; F01N 2900/1606; B01D 46/66
    See application file for complete search history.

(56) References Cited

U.S. PATENT DOCUMENTS

| | | | | |
|---|---|---|---|---|
| 2010/0018190 | A1* | 1/2010 | Harada | B01D 53/944 60/286 |
| 2012/0024274 | A1* | 2/2012 | Hakariya | F02D 41/1456 123/704 |
| 2013/0152551 | A1* | 6/2013 | Kotnish | F01N 3/023 55/282.3 |
| 2018/0016959 | A1* | 1/2018 | Fujii | F01N 3/021 |
| 2018/0149102 | A1* | 5/2018 | Kobashi | F02D 41/029 |
| 2019/0231252 | A1* | 8/2019 | Paszicsnyek | A61B 17/1764 |
| 2020/0116092 | A1* | 4/2020 | Nakagawa | F01N 3/34 |
| 2020/0217235 | A1* | 7/2020 | Kobashi | F01N 3/021 |
| 2021/0079860 | A1* | 3/2021 | Yokoyama | F01N 3/023 |

FOREIGN PATENT DOCUMENTS

| | | |
|---|---|---|
| JP | 2016-130456 A | 7/2016 |
| JP | 2019-190358 A | 10/2019 |
| JP | 2020-60137 A | 4/2020 |

OTHER PUBLICATIONS

International Search Report (PCT/ISA/210) issued in PCT Application No. PCT/JP2022/026663 dated Sep. 20, 2022 with English translation (4 pages).

Japanese-language Written Opinion (PCT/ISA/237) issued in PCT Application No. PCT/JP2022/026663 dated Sep. 20, 2022 with English translation (7 pages).

Japanese-language Office Action issued in Japanese Application No. 2023-533131 dated Aug. 27, 2024 with English translation (8 pages).

* cited by examiner

INTERNAL-COMBUSTION ENGINE CONTROL DEVICE AND FILTER REGENERATION METHOD

TECHNICAL FIELD

The present invention relates to an internal-combustion engine control device for an internal-combustion engine that is fueled by gasoline and includes a filter for trapping particulate matter in exhaust gas, and relates to a filter regeneration method for regenerating the filter.

BACKGROUND ART

Patent Document 1 discloses an exhaust gas purification system that traps particulate matter (PM) in exhaust gas of a diesel engine.

The exhaust gas purification system sets a PM burning determination temperature $T_{PM}$ that is lower than a regeneration target temperature T by a first predetermined temperature A [in degrees Celsius] and, during regeneration, determines that regeneration is being performed when an exhaust gas temperature $T_G$ is higher than PM burning determination temperature $T_{PM}$. The exhaust gas purification system includes a target temperature changing unit that increases regeneration target temperature T and also increases first predetermined temperature A when it is determined that PM is likely to remain unburned in an oxidation catalyst.

REFERENCE DOCUMENT LIST

Patent Document

Patent Document 1: Japanese Patent No. 5621322

SUMMARY OF THE INVENTION

Problem to be Solved by the Invention

For an internal-combustion engine fueled by gasoline and including a filter (gasoline particulate filter (GPF)) that traps particulate matter (hereafter also referred to as PM) in exhaust gas, when regenerating the filter by burning off the PM trapped in the filter by performing fuel cut control of temporarily stopping supply of fuel to the internal-combustion engine, it has been a problem that although the PM in the central part of the filter, in which exhaust gas mainly flows, is burned off and removed, the PM in peripheral parts of the filter remains unburned.

The present invention is made in view of the above problem in the related art, and an object of the present invention is to provide an internal-combustion engine control device and a filter regeneration method that can prevent PM from remaining unburned while regenerating the filter.

Means for Solving the Problem

According to an aspect of the present invention, when requesting regeneration of a filter, an internal-combustion engine control device performs fuel cut control to temporarily stop the supply of fuel to the internal-combustion engine to burn particulate matter trapped in the filter and repeats the fuel cut control while performing exhaust temperature control of increasing the temperature of exhaust gas from the internal-combustion engine.

According to another aspect of the present invention, a filter regeneration method includes repeating the fuel cut control of temporarily stopping supply of fuel to the internal-combustion engine while increasing the temperature of exhaust gas from the internal-combustion engine to burn and remove particulate matter trapped in the filter.

Effects of the Invention

The present invention makes it possible to prevent particulate matter from remaining unburned during the regeneration process of the filter.

MODE FOR CARRYING OUT THE INVENTION

An embodiment of the present invention is described below.

Figure 1:
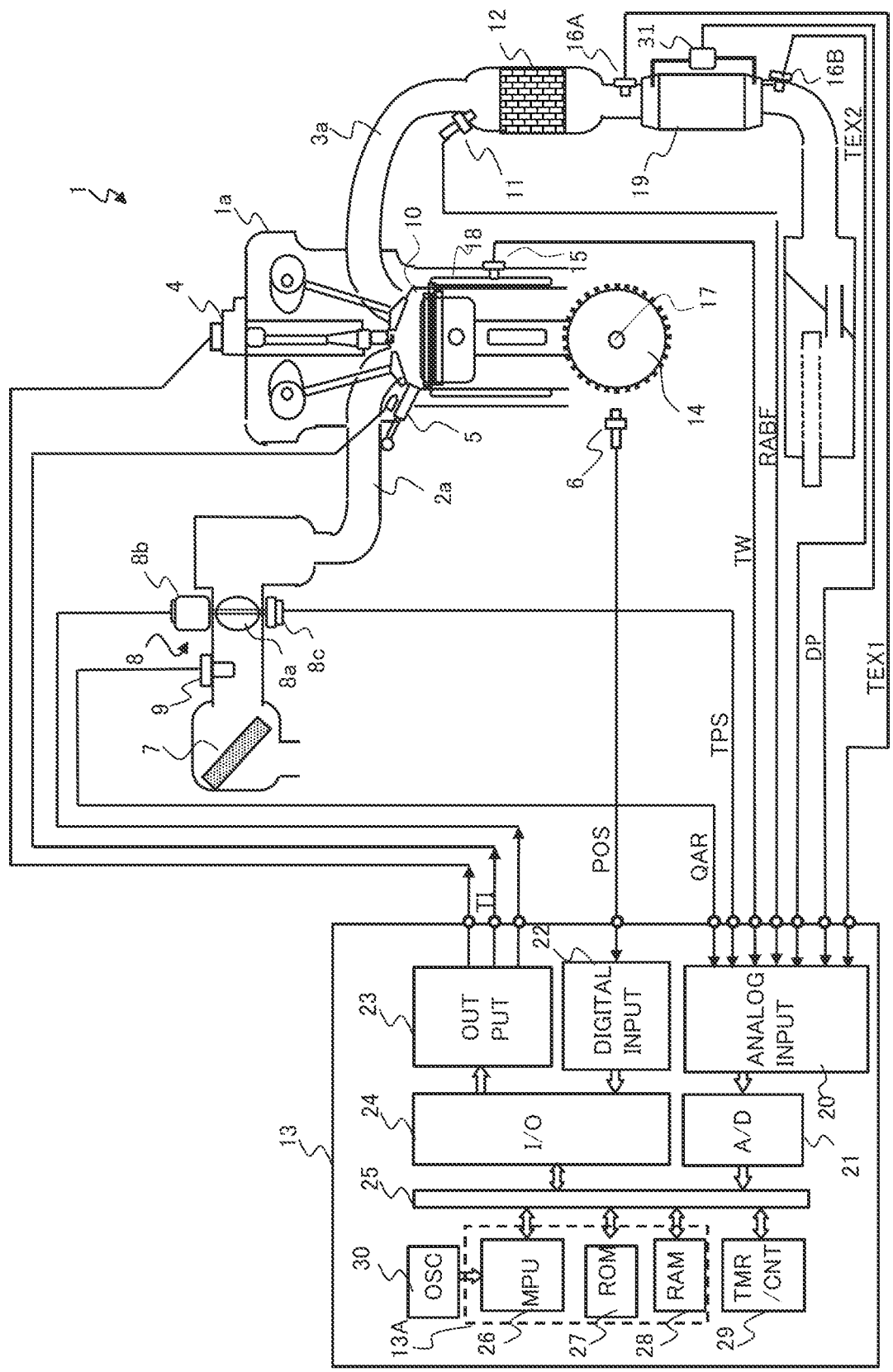
FIG. 1 is a system diagram of an example of an internal-combustion engine.

FIG. 1 is a diagram illustrating an example of the configuration of an internal-combustion engine for which an internal-combustion engine control device and a filter regeneration method according to the present invention are applied.

An internal-combustion engine 1 is a spark-ignition engine fueled by gasoline and is installed in a vehicle (not shown).

Internal-combustion engine 1 includes an engine body 1a including an ignition device 4 and a fuel injection valve 5 used as a fuel injection device.

The flow rate of air, which has passed through an air cleaner 7, is adjusted by a throttle valve 8a of an electronically controlled throttle 8, and then the air is sucked into a combustion chamber 10 via an intake passage 2a.

Fuel injection valve 5 is provided for each cylinder of internal-combustion engine 1 and injects fuel directly into combustion chamber 10.

That is, internal-combustion engine 1 is an in-cylinder direct injection internal-combustion engine.

Electronically controlled throttle 8 changes the opening degree of throttle valve 8a by using a throttle motor 8b.

A throttle opening sensor 8c outputs a throttle opening signal TPS indicating the opening degree of throttle valve 8a.

A crank angle sensor 6 detects the teeth of a ring gear 14 and thereby outputs a crank angle signal POS that is a pulse signal for each predetermined rotation angle of a crank shaft 17.

A water temperature sensor 15 outputs a water temperature signal TW indicating the temperature of cooling water in a water jacket 18 provided in engine body 1a.

A flow detection device 9 is disposed upstream of electronically controlled throttle 8 and outputs an intake airflow rate signal QAR indicating an intake airflow rate of internal-combustion engine 1.

Also, a three-way catalyst device 12 and a gasoline particulate filter 19 (hereafter referred to as "GPF 19") are disposed in an exhaust path 3a of internal-combustion engine 1.

Three-way catalyst device 12 eliminates harmful components in exhaust gas by an oxidation-reduction reaction.

GPF 19 disposed downstream of three-way catalyst device 12 traps particulate matter (PM) in exhaust gas.

In internal-combustion engine 1, PM is generated when an air-fuel mixture is burned. In particular, in in-cylinder direct injection internal-combustion engine 1, inhomogeneity of the air-fuel mixture in combustion chamber 10 is a factor that increases the generation of PM.

For this reason, GPF 19 is provided in exhaust path 3a of internal-combustion engine 1 to trap PM and to thereby reduce the emission of PM.

As is described in detail later, before the deposition amount of PM in GPF 19 increases and clogging occurs, a regeneration process is performed to burn off and remove PM trapped in GPF 19 and to thereby regenerate GPF 19.

Although internal-combustion engine 1 of the present embodiment includes three-way catalyst device 12 and GPF 19 separately, the present invention is not limited to this embodiment. For example, a three-way catalyst purification function may be added to GPF 19, and three-way catalyst device 12 may be omitted from an exhaust system.

Figure 2:
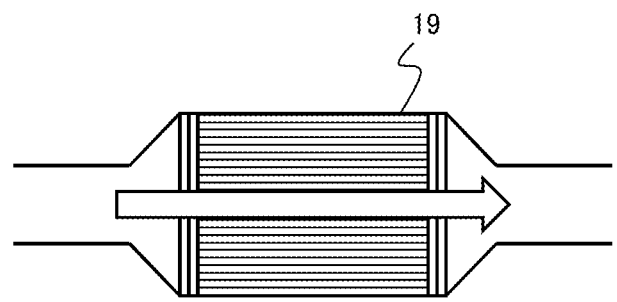
FIG. 2 is a side view of a GPF.
Figure 3:
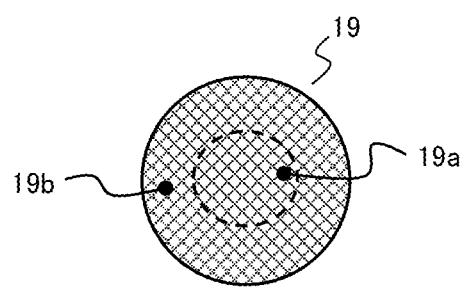
FIG. 3 is a cross-sectional view of the GPF.

FIG. 2 is a side view and FIG. 3 is a cross-sectional view of GPF 19. GPF 19 has a cylindrical shape in which exhaust gas flows along the axial direction. The cross section of GPF 19 includes a central part 19a through which exhaust gas mainly flows and an annular peripheral part 19b surrounding central part 19a.

An air-fuel ratio sensor 11 is disposed in exhaust path 3a upstream of three-way catalyst device 12 and outputs an exhaust air-fuel ratio signal RABF indicating an exhaust air-fuel ratio based on the oxygen concentration in the exhaust gas.

A first exhaust temperature sensor 16A is disposed in exhaust path 3a upstream of GPF 19, in other words, in exhaust path 3a between three-way catalyst device 12 and GPF 19, and outputs a first exhaust temperature signal TEX1 indicating an exhaust temperature at the entrance of GPF 19.

Furthermore, a second exhaust temperature sensor 16B is disposed in exhaust path 3a downstream of GPF 19 and outputs a second exhaust temperature signal TEX2 indicating an exhaust temperature at the exit of GPF 19.

A differential pressure sensor 31 outputs a differential pressure signal DP indicating a differential pressure between pressures at the upstream and the downstream of GPF 19 (or a differential pressure before and after a filter).

A control device 13, which is an electronic control device including a microcomputer, obtains throttle opening signal TPS, crank angle signal POS, water temperature signal TW, intake airflow rate signal QAR, exhaust air-fuel ratio signal RABF, first exhaust temperature signal TEX1, second exhaust temperature signal TEX2, and differential pressure signal DP that are output from the various sensors described above.

Then, through calculation processes based on various types of information obtained, control device 13 obtains operation amounts for engine control, such as ignition control, fuel injection control, and throttle opening control, and outputs the obtained operation amounts to ignition device 4, fuel injection valve 5, and electronically controlled throttle 8 to control the operations of internal-combustion engine 1.

To obtain data from the outside and to output operation amounts to the outside, control device 13 includes an analog input circuit 20, an A/D conversion circuit 21, a digital input circuit 22, an output circuit 23, and an I/O circuit 24.

Also, to perform data calculation processes, control device 13 includes a microcomputer 13A including a microprocessor unit (MPU) 26, a read-only memory (ROM) 27, and a random access memory (RAM) 28.

Analog input circuit 20 receives intake airflow rate signal QAR, throttle opening signal TPS, exhaust air-fuel ratio signal RABF, first exhaust temperature signal TEX1, second exhaust temperature signal TEX2, water temperature signal TW, and differential pressure signal DP.

Various signals input to analog input circuit 20 are converted by A/D conversion circuit 21 into digital signals, and the digital signals are output to a bus 25.

Crank angle signal POS input to digital input circuit 22 is output to bus 25 via I/O circuit 24.

MPU 26, ROM 27, RAM 28, and a timer/counter 29 are connected to bus 25, and MPU 26, ROM 27, and RAM 28 send and receive data via bus 25.

A clock signal is supplied from a clock generator 30 to MPU 26, and MPU 26 performs various calculations and processes in synchronization with the clock signal.

ROM 27 is, for example, an electrically erasable programmable read-only memory (EEPROM) that stores data such that the data is erasable and rewritable. For example, ROM 27 stores programs, set values, and initial values for operating control device 13 (specifically, microcomputer 13A).

Information stored in ROM 27 is read into RAM 28 and MPU 26 via bus 25.

RAM 28 is used as a work area for temporarily storing calculation results and processing results of MPU 26.

Timer/counter 29 is used, for example, to measure time and store counts.

Calculation results and processing results of MPU 26 are output to bus 25, input to I/O circuit 24, and then supplied from output circuit 23 to, for example, ignition device 4, fuel injection valve 5, and electronically controlled throttle 8.

Control device 13 calculates an injection pulse width TI corresponding to a fuel injection amount based on the operating conditions of internal-combustion engine 1 and outputs an injection pulse signal with injection pulse width TI to each fuel injection valve 5 in synchronization with the injection timing of the corresponding cylinder.

Fuel injection valve 5 opens during the ON period of the injection pulse signal and injects an amount of fuel proportional to the valve opening time (in other words, the ON time of the injection pulse signal) directly into combustion chamber 10.

In the calculation of injection pulse width TI (in other words, a fuel injection amount), control device 13 calculates a basic injection pulse width TP based on intake airflow rate signal QAR and an engine rotational speed signal NE obtained from crank angle signal POS. Also, when internal-combustion engine 1 is being operated in an air-fuel ratio feedback control area, control device 13 calculates an air-fuel ratio feedback correction factor KAF for correcting basic injection pulse width TP based on a difference between an exhaust air-fuel ratio detected by air-fuel ratio sensor 11 and a target air-fuel ratio.

Then, control device 13 corrects basic injection pulse width TP with, for example, air-fuel ratio feedback correction factor KAF to obtain injection pulse width TI.

Also, control device 13 calculates a target ignition timing (specifically, a target ignition advance) based on information such as the load and the rotational speed of internal-combustion engine 1 and gives an operation amount to ignition device 4 such that ignition device 4 performs spark ignition at the calculated target ignition timing.

Also, control device 13 calculates a target throttle opening degree based on information, such as an accelerator opening degree, and gives an operation amount to throttle motor 8b such that the actual opening degree of throttle valve 8a matches the target throttle opening degree.

Furthermore, control device 13 estimates a deposition amount (in other words, a trapped amount) of PM in GPF 19 and determines whether regeneration is required based on the estimated deposition amount.

When it is determined that regeneration is required, control device 13 controls internal-combustion engine 1 to perform a regeneration process to burn off and remove the PM trapped in GPF 19 and thereby prevent clogging of GPF 19.

As the regeneration process, the control device 13 repeats fuel cut control for burning the PM trapped in GPF 19 while performing exhaust temperature control for increasing the temperature of exhaust gas of internal-combustion engine 1.

Fuel cut control is engine control for temporarily stopping fuel injection by fuel injection valve 5, that is, temporarily stopping supply of fuel to internal-combustion engine 1, while internal-combustion engine 1 is in operation.

In the regeneration process, control device 13 performs at least one of lean combustion, post injection, and ignition timing retard as exhaust temperature control to increase the temperature of exhaust gas of internal-combustion engine 1 and thereby increase the temperature of GPF 19.

Lean combustion is engine control that makes the air-fuel ratio of an air-fuel mixture of internal-combustion engine 1 leaner than a theoretical air-fuel ratio by adjusting the fuel amount injected by fuel injection valve 5.

Post injection is engine control for causing fuel injection valve 5 to inject fuel into a cylinder again after main injection.

Performing post injection makes it possible to discharge unburned fuel from the cylinder. Post injection may also be performed to delay the combustion of fuel in the cylinder.

Ignition timing retard is engine control for delaying the combustion timing by making the ignition timing of ignition device 4 later than basic ignition timing corresponding to, for example, the engine load and the engine rotational speed.

Below, it is described that different types of engine control are required for internal-combustion engine 1 fueled by gasoline and for a diesel engine to burn off and remove PM trapped in a filter.

In a regeneration process of a diesel particulate filter (hereafter referred to as a DPF) for trapping PM in a diesel engine, because lean combustion is performed in the diesel engine and its exhaust temperature is high, the temperature of the DPF can be increased to a temperature at which the PM burns by performing in-cylinder post injection.

On the other hand, because stoichiometric combustion is performed in internal-combustion engine 1 fueled by gasoline, the exhaust temperature is low and the amount of oxygen in the exhaust gas is small compared with a diesel engine, and it is difficult to cause PM trapped in GPF 19 to react with oxygen.

Also, in internal-combustion engine 1, even if post injection is performed to inject fuel into the cylinder again after the main injection and thereby discharge unburned fuel from the cylinder, although the exhaust temperature increases, PM trapped in GPF 19 is not likely to react with oxygen, and it is difficult to burn and remove the PM.

For this reason, in a regeneration process for burning and removing PM trapped in GPF 19, control device 13 performs fuel cut control to increase the amount of oxygen introduced into GPF 19.

That is, control device 13 temporarily stops fuel injection by fuel injection valve 5 to stop fuel combustion in combustion chamber 10 so that air taken into internal-combustion engine 1 flows into exhaust path 3a and is introduced into GPF 19 without change.

However, even if the fuel cut control is simply repeated by control device 13, although PM in central part 19a can be burned and removed, PM in peripheral part 19b remains unburned.

Therefore, to prevent the PM in peripheral part 19b from remaining unburned, control device 13 repeats the fuel cut control while increasing the temperature of GPF 19 (in other words, the exhaust temperature) before the fuel cut control.

Below, why PM remains unburned when fuel cut control is simply repeated is described.

FIGS. 4A to 4E are diagrams illustrating a process in which PM is deposited in GPF 19 and a deposition state after fuel cut control is performed based on a regeneration requirement.

Figure 4A:
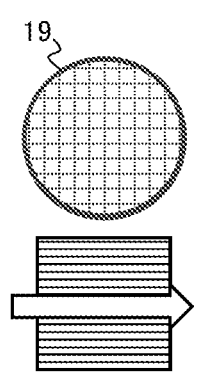
FIGS. 4A to 4E are diagrams for describing a PM deposition process in the GPF.
Figure 4B:
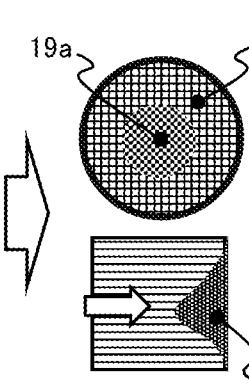

When deposition starts from an initial state (see FIG. 4A) in which PM is not deposited in GPF 19, PM is first deposited in central part 19a of GPF 19 (see FIG. 4B).

Figure 4C:
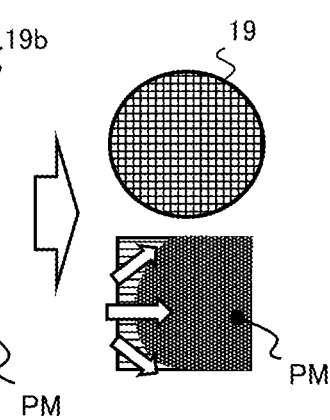

Then, when the flow of exhaust gas changes due to the deposition of PM in central part 19a and the exhaust gas starts to flow to peripheral part 19b, PM starts to also be deposited in peripheral part 19b of GPF 19 (see FIG. 4C).

Figure 4D:
Figure 4E:
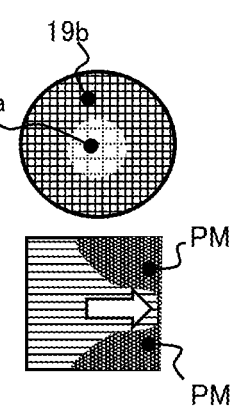

When the deposition amount of PM in GPF 19 exceeds a threshold, control device 13 determines that regeneration is required and performs fuel cut control as regeneration control (see FIG. 4D).

Although the amount of oxygen introduced into GPF 19 increases as a result of fuel cut control, exhaust gas including a large amount of oxygen mainly flows through central part 19a of GPF 19.

For this reason, although the PM deposited in central part 19a of GPF 19 is sequentially burned and removed by performing fuel cut control, the PM deposited in peripheral part 19b, which is out of the main stream of exhaust gas, remains unburned.

When PM is in an unevenly distributed state in which the PM in central part 19a of GPF 19 is burned off and removed but the PM in peripheral part 19b remains unburned, even if fuel cut control is repeated thereafter, the removal by burning of the PM deposited in peripheral part 19b does not proceed because exhaust gas passes through central part 19a in which the PM has been burned and removed.

Figure 5:
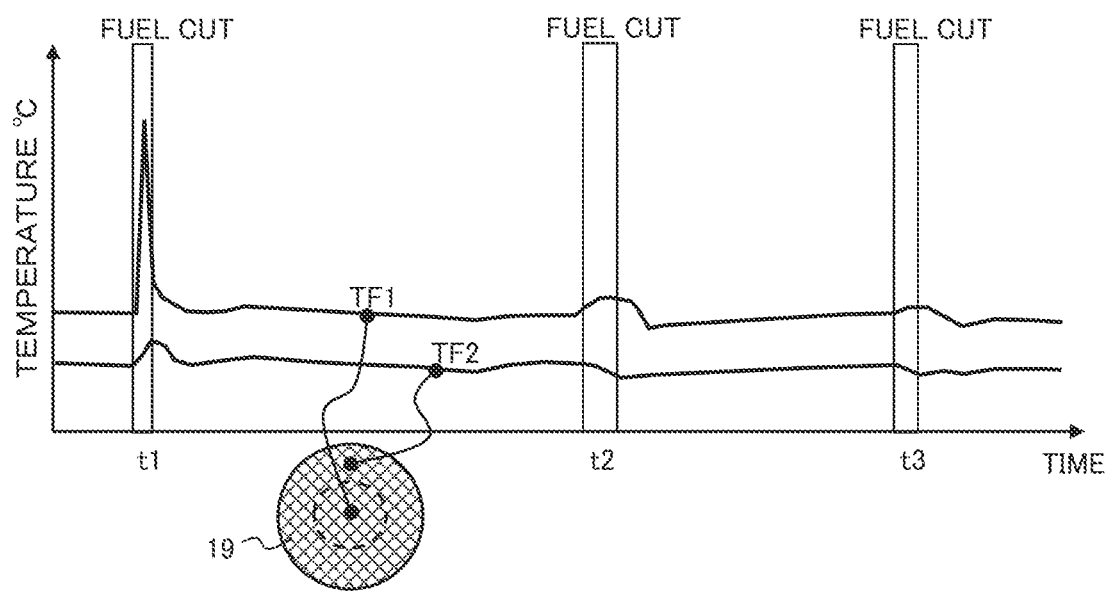
FIG. 5 is a timing chart showing changes in a GPF temperature caused by fuel cut control.

FIG. 5 illustrates changes in a temperature TF1 of central part 19a of GPF 19 and a temperature TF2 of peripheral part 19b of GPF 19 when fuel cut control is repeated three times by control device 13 at predetermined time intervals based on a regeneration requirement.

When regeneration is required and first fuel cut control is performed at time t1 in FIG. 5, PM deposited in central part 19a of GPF 19 reacts with oxygen in exhaust gas and burns. Although this results in an increase in temperature TF1 of central part 19a, the change in temperature TF2 is small because the burning of PM in peripheral part 19b does not proceed.

Because the PM deposited in central part 19a of GPF 19 is almost burned off and removed by the first fuel cut control, even when second fuel cut control is performed at time t2 in FIG. 5, the increase in temperature TF1 of central part 19a is less than that when the first fuel cut control is performed.

Also, even when the second fuel cut control is performed, because exhaust gas passes through central part 19a of GPF 19, the removal by burning of the PM remaining unburned in peripheral part 19b does not proceed, and the increase in temperature TF2 of peripheral part 19b is small.

Furthermore, even when third fuel cut control is performed at time t3 in FIG. 5, because the flow of exhaust gas and the deposition state are substantially the same as those when the second fuel cut control is performed, the removal by burning of the PM remaining unburned in peripheral part 19b does not proceed, and the increase in temperature TF2 of peripheral part 19b is small.

Thus, even if fuel cut control is simply repeated by control device 13, the PM in peripheral part 19b remains unburned.

For the above reason, control device 13 performs exhaust temperature control to make the temperature of GPF 19 before the start of the second or subsequent fuel cut control higher than the temperature of GPF 19 before the start of the previous fuel cut control and thereby makes the PM remaining unburned in peripheral part 19b easier to burn.

In other words, control device 13 repeats fuel cut control for burning PM trapped in GPF 19 while gradually increasing the temperature of GPF 19 (in other words, the exhaust temperature) before the fuel cut control.

This regeneration process is based on the finding of the inventors that the burning state of PM in peripheral part 19b of GPF 19 changes depending on temperature of GPF 19 (in other words, the temperature of exhaust gas introduced into GPF 19) before the start of fuel cut control.

Figure 6:
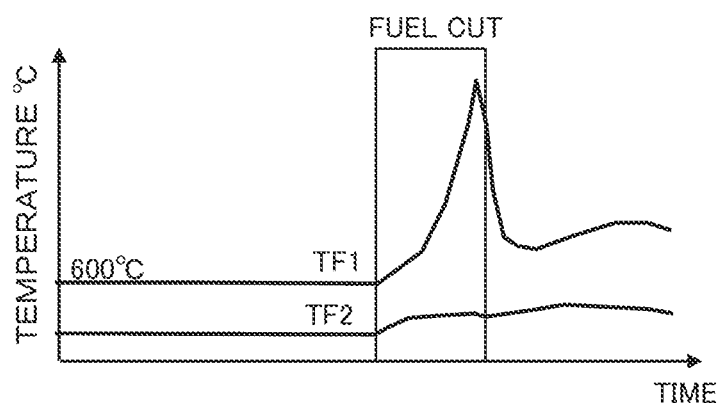
FIG. 6 is a timing chart showing a correlation between a GPF temperature before fuel cut control and a change in the GPF temperature caused by the fuel cut control.
Figure 7:
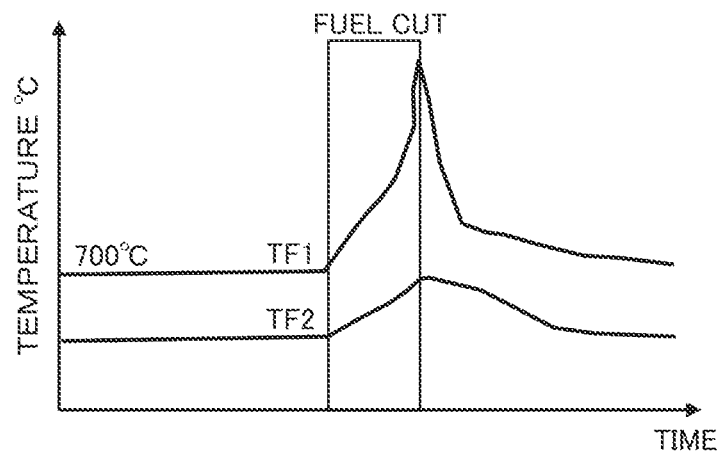
FIG. 7 is a timing chart showing a correlation between a GPF temperature before fuel cut control and a change in the GPF temperature caused by the fuel cut control.

FIGS. 6 and 7 are diagrams showing changes in temperature TF1 of central part 19a of GPF 19 and temperature TF2 of peripheral part 19b when fuel cut control is performed.

The PM deposition state before fuel cut control is the same in FIGS. 6 and 7. However, the temperature conditions of GPF 19 before fuel cut control, specifically, temperatures TF1 of central part 19a, differ between FIGS. 6 and 7.

Specifically, temperature TF1 of central part 19a before fuel cut control is set at 600 degrees Celsius in FIG. 6 and is set at 700 degrees Celsius in FIG. 7.

In the case of FIG. 6 in which the temperature of GPF 19 before fuel cut control is relatively low, the increase in temperature TF2 of peripheral part 19b caused by the fuel cut control is very small compared to the increase in temperature TF1 of central part 19a. This indicates that the removal by burning of PM in peripheral part 19b has not proceeded.

In contrast, in the case of FIG. 7 in which the temperature of GPF 19 before fuel cut control is relatively high, the increase in temperature TF2 of peripheral part 19b caused by the fuel cut control is greater than that in FIG. 6. This indicates that a greater amount of PM in peripheral part 19b has been burned and removed compared to the case of FIG. 6.

That is, FIGS. 6 and 7 indicate that PM in peripheral part 19b is easier to burn by increasing the temperature of GPF 19 before fuel cut control.

Figure 8:
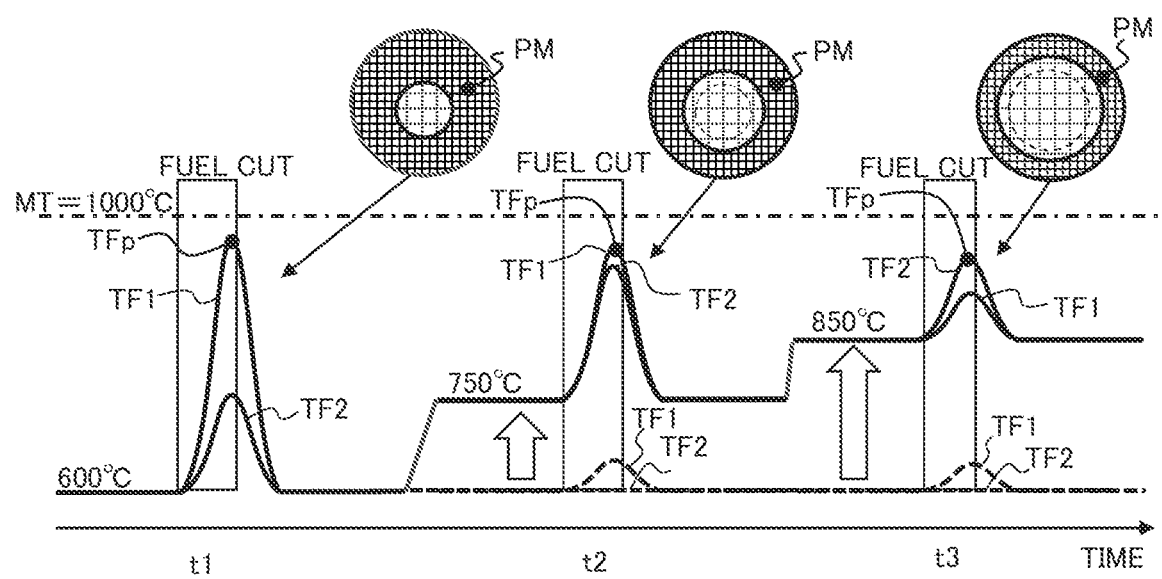
FIG. 8 is a timing chart illustrating a regeneration process in which fuel cut control is performed multiple times while increasing a GPF temperature before the fuel cut control.

FIG. 8 is a timing chart showing examples of changes in temperature TF1 of central part 19a, changes in temperature TF2 of peripheral part 19b, and changes in the PM deposition state after fuel cut control that are observed when fuel cut control for regenerating GPF 19 is repeated three times while gradually increasing the temperature of GPF 19 before fuel cut control.

In the examples shown in FIG. 8, the temperature of GPF 19 (specifically, temperature TF1 of central part 19a) is set at 600 degrees Celsius before the first fuel cut control, at 750 degrees Celsius before the second fuel cut control, and at 850 degrees Celsius before the third fuel cut control.

The first fuel cut control at time t1 is performed in a state in which the temperature of GPF 19 is 600 degrees Celsius.

At the first fuel cut control, PM in peripheral part 19b does not substantially burn, whereas PM in central part 19a mainly burns. Accordingly, while temperature TF1 of central part 19a increases significantly, the increase in temperature TF2 of peripheral part 19b is relatively small.

After the first fuel cut control, control device 13 increases the exhaust temperature by performing engine control, such as lean combustion, post injection, or ignition timing retard, and thereby increases the temperature of GPF 19 (specifically, temperature TF1 of central part 19a) to 750 degrees Celsius.

Then, at time t2 when the temperature of GPF 19 increases to 750 degrees Celsius, control device 13 performs the second fuel cut control.

As a result of the second fuel cut control, temperature TF1 of central part 19a increases, and temperature TF2 of peripheral part 19b increases to a value close to temperature TF1 of central part 19a.

This indicates that the PM in peripheral part 19b has been made easier to burn as a result of increasing the temperature of GPF 19 to 750 degrees Celsius prior to the second fuel cut control and that the PM in peripheral part 19b, specifically, a ring-shaped portion of PM remaining unburned after the first fuel cut control, has been successfully burned off and removed.

After the second fuel cut control, control device 13 increases the exhaust temperature by performing engine control, such as lean combustion, post injection, or ignition timing retard, and thereby increases the temperature of GPF 19 to 850 degrees Celsius, which is higher than the temperature before the second fuel cut control.

Then, at time t3 when temperature of GPF 19 increases to 850 degrees Celsius, control device 13 performs the third fuel cut control.

When the third fuel cut control is performed, the increase in temperature TF2 of peripheral part 19b is greater than the increase in temperature TF1 of central part 19a.

This indicates that the removal by burning of PM in central part 19a has almost been completed as a result of the second fuel cut control, and the burning of PM in central part 19a has not substantially occurred at the third fuel cut control.

The above also indicates that the PM remaining unburned in peripheral part 19b even after the second fuel cut control has been made easier to burn as a result of further increasing the temperature of GPF 19 before performing the third fuel cut control and that the PM in peripheral part 19b, specifically, a ring-shaped portion of PM remaining unburned after the second fuel cut control, has been burned and removed.

Thus, control device 13 repeats fuel cut control for burning PM trapped in GPF 19 while gradually increasing the temperature of GPF 19 before the fuel cut control so that the removal by burning of the PM in peripheral part 19b can proceed steadily each time fuel cut control is performed and the PM in peripheral part 19b can be prevented from remaining unburned.

Here, when PM trapped in GPF 19 is burned and removed by fuel cut control, the temperature of GPF 19 may increase due to the burning of the PM, and melting loss of GPF 19 may occur.

Therefore, when burning and removing PM trapped in GPF 19 by fuel cut control, control device 13 needs to control the temperature of GPF 19 so as not to exceed a melting loss temperature MT (for example, melting loss temperature MT=850–1000 degrees Celsius).

Control device 13 controls a peak temperature TFp of GPF 19 resulting from fuel cut control so that temperature TF of GPF 19 does not exceed melting loss temperature MT as a result of the fuel cut control, by adjusting the target temperature of GPF 19 before the fuel cut control and/or adjusting the period of time (hereafter referred to as a fuel cut time) for which the supply of fuel is stopped in the fuel cut control.

Specifically, control device 13 estimates peak temperature TFp of GPF 19 resulting from fuel cut control based on temperature TF of GPF 19 and the deposition amount of PM before the fuel cut control and sets the target temperature and/or the fuel cut time so that peak temperature TFp does not exceed melting loss temperature MT.

Furthermore, control device 13 may be configured to stop the fuel cut control and restart the fuel supply when it is determined that peak temperature TFp of GPF 19 is likely to exceed melting loss temperature MT after the start of the fuel cut control based on, for example, an exhaust temperature TEX2 or when it is determined that temperature TF of GPF 19 (or exhaust temperature TEX2) has exceeded a threshold after the start of the fuel cut control.

Figure 9:
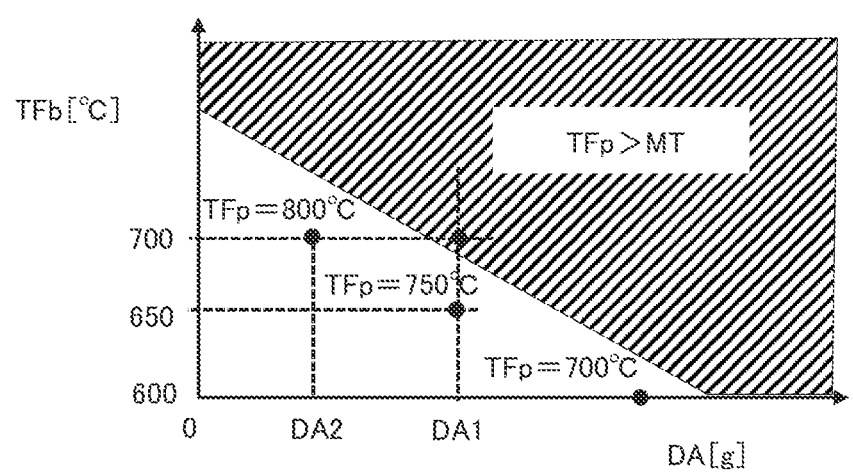
FIG. 9 is a diagram showing a correlation among a deposition amount DA, a temperature TFb before fuel cut control, and a peak temperature TFp.

FIG. 9 is a graph showing changes in the temperature of GPF 19 resulting from the first fuel cut control that is performed (at time t1 in FIG. 5) when PM is deposited up to central part 19a of GPF 19 and regeneration is required. In FIG. 9, the vertical axis indicates a temperature TFb [in degrees Celsius] of GPF 19 before fuel cut control, and the horizontal axis indicates a deposition amount DA [g] of PM before fuel cut control. FIG. 9 shows peak temperature TFp [in degrees Celsius] of GPF 19 increased by fuel cut control in relation to temperature TFb [in degrees Celsius] and deposition amount DA [g].

For example, when deposition amount DA of PM before fuel cut control is a first predetermined value DA1 and temperature TFb of GPF 19 before the fuel cut control is 650 degrees Celsius, peak temperature TFp of GPF 19 increased by the fuel cut control is 750 degrees Celsius, which is less than melting loss temperature MT.

On the other hand, when temperature TFb of GPF 19 before the fuel cut control is 700 degrees Celsius, even if deposition amount DA of PM before fuel cut control is the same first predetermined value DA1, peak temperature TFp of GPF 19 increased by the fuel cut control exceeds melting loss temperature MT.

Also, when deposition amount DA of PM before fuel cut control is a second predetermined value DA2 that is less than first predetermined value DA1, even if temperature TFb of GPF 19 before the fuel cut control is 700 degrees Celsius, peak temperature TFp of GPF 19 increased by the fuel cut control is 800 degrees Celsius that is less than melting loss temperature MT.

In other words, when temperature TFb of GPF 19 before fuel cut control is constant, peak temperature TFp increases as deposition amount DA of PM before the fuel cut control increases.

Also, when deposition amount DA of PM before fuel cut control is constant, peak temperature TFp increases as temperature TFb of GPF 19 before the fuel cut control increases.

Accordingly, by referring to the characteristics shown in FIG. 9 based on deposition amount DA of PM, control device 13 sets a target value to a highest possible temperature TFb within a range in which peak temperature TFp does not exceed melting loss temperature MT and controls the actual temperature of GPF 19 before fuel cut control to match the target value.

Also, by referring to the characteristics shown in FIG. 9 based on deposition amount DA of PM and a target value of temperature TFb preset for each instance of fuel cut control, control device 13 estimates peak temperature TFp, and when the estimated peak temperature TFp exceeds melting loss temperature MT, decreases the fuel cut time such that the decrease is greater as the difference between peak temperature TFp and melting loss temperature MT increases.

This makes it possible to increase the amount of PM burned and removed by fuel cut control as much as possible while keeping peak temperature TFp to less than or equal to melting loss temperature MT.

Figure 10:
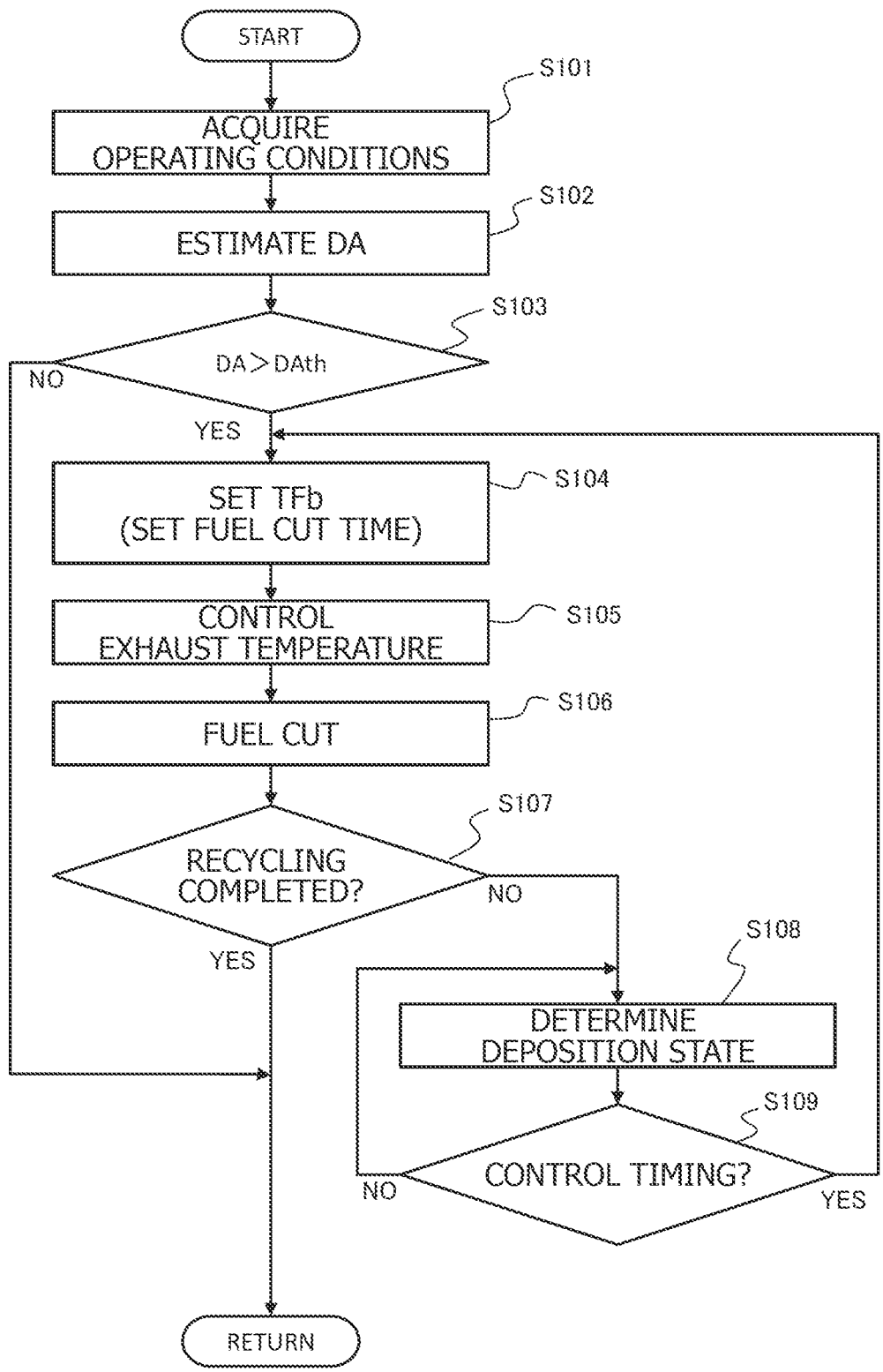
FIG. 10 is a flowchart illustrating a regeneration process.

FIG. 10 is a flowchart illustrating an example of a regeneration process of GPF 19 performed by control device 13.

The routine illustrated in the flowchart of FIG. 10 is executed in response to, for example, an interrupt that is generated at predetermined intervals.

In step S101, control device 13 acquires information on the operating conditions of internal-combustion engine 1 including intake airflow rate QAR, engine rotational speed NE, air-fuel ratio RABF, water temperature TW, differential pressure DP, first exhaust temperature TEX1, and second exhaust temperature TEX2. Next, at step S102, control device 13 estimates deposition amount DA of PM in GPF 19.

In this step, control device 13 estimates deposition amount DA by estimating the emission amount of PM from internal-combustion engine 1 based on the operating conditions of internal-combustion engine 1, estimating the burning amount of PM to be burned by the regeneration process (fuel cut control) based on the temperature of GPF 19 and a deposition amount, and totaling differences obtained by subtracting the burning amount from the emission amount.

Control device 13 can estimate the temperature (internal temperature) of GPF 19 based on exhaust temperatures TEX1 and TEX2 and an exhaust flow rate and can also obtain the temperature of GPF 19 from an output signal of a filter temperature sensor that detects the temperature of GPF 19.

Furthermore, control device 13 can estimate deposition amount DA of PM based on differential pressure DP.

The estimation accuracy of deposition amount DA based on differential pressure DP is high when internal-combustion engine 1 is operating at a high load and high rotation range.

Therefore, for example, control device 13 may adopt an estimation result of deposition amount DA based on differential pressure DP in a high load and high rotation range and update deposition amount DA by totaling emission amounts in a range other than the high load and high rotation range.

In the estimation process of deposition amount DA based on differential pressure DP, because the deposition amount varies depending on the deposition state in GPF 19 even if differential pressure DP is constant, control device 13 changes the correlation between differential pressure DP and deposition amount DA according to the deposition state.

The deposition state indicates whether PM is deposited in central part 19*a*, in other words, whether fuel cut control has been performed to burn and remove PM.

When deposition proceeds from the initial state in which PM has not been deposited in GPF 19, the deposition starts from central part 19*a* of GPF 19 and proceeds from central part 19*a* to peripheral part 19*b* (see FIG. 4).

On the other hand, when fuel cut control is performed to burn and remove PM, the PM deposited in central part 19*a* is burned first (see FIG. 8), resulting in a state in which PM is not deposited in central part 19*a*.

Thus, because PM is deposited in central part 19*a* before fuel cut control, but is not deposited in central part 19*a* after fuel cut control, differential pressure DP varies even when deposition amount DA is constant.

Specifically, in a state after fuel cut control in which PM is not deposited in central part 19*a*, exhaust gas can pass through central part 19*a* and the pressure loss is reduced. Therefore, compared with a state before fuel cut control in which PM is deposited in central part 19*a*, differential pressure DP is less at the same deposition amount DA.

In other words, when differential pressure DP is constant, deposition amount DA in a state before fuel cut control, in which PM is deposited in central part 19*a* through which exhaust gas passes, is less than deposition amount DA in a state after fuel cut control in which PM is not deposited in central part 19*a* through which exhaust gas passes.

Therefore, when deposition amount DA is estimated based on information on differential pressure DP before and after GPF 19, control device 13 estimates deposition amount DA such that deposition amount DA estimated after the first fuel cut control is greater than deposition amount DA estimated before the first fuel cut control when differential pressure DP before and after GPF 19 is constant.

Figure 11:
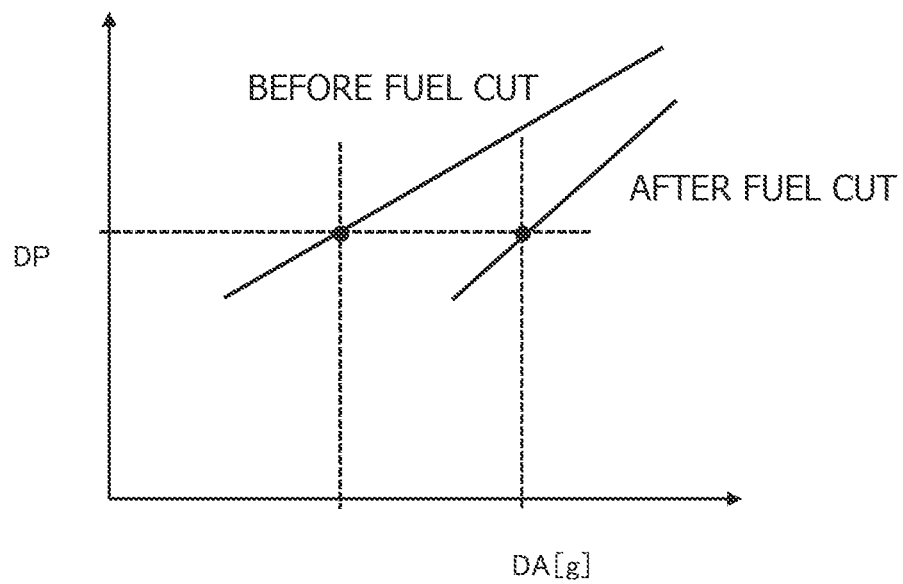
FIG. 11 is a diagram showing a correlation between a differential pressure and an estimated deposition amount.

FIG. 11 shows characteristics used to obtain deposition amount DA based on differential pressure DP in a state before fuel cut control for burning PM (in other words, a state in which PM is deposited in central part 19*a*), and characteristics used to obtain deposition amount DA based on differential pressure DP in a state after fuel cut control for burning PM (in other words, a state in which PM is not deposited in central part 19*a*).

FIG. 11 shows characteristics with which deposition amount DA estimated in a state after fuel cut control is greater than deposition amount DA estimated in a state before fuel cut control when differential pressure DP is constant.

After estimating deposition amount DA at step S102, control device 13, in step S103, compares deposition amount DA with a threshold DAth set in a memory to determine whether a regeneration process of GPF 19 is required.

Threshold DAth is used to determine whether deposition amount DA has increased to a level at which the regeneration process is required and corresponds to the maximum allowable value of deposition amount DA.

Control device 13 may also determine whether regeneration is required based on, for example, information on the operating time of internal-combustion engine 1, information on the travel distance of a vehicle, and/or information on the total intake airflow of internal-combustion engine 1.

When deposition amount DA is less than or equal to threshold DAth, control device 13 determines that regeneration is not required, ends this routine at step S103, and does not perform the regeneration process.

On the other hand, when deposition amount DA is greater than threshold DAth, control device 13 determines that regeneration is required and proceeds from step S103 to the regeneration process performed at step S104 and subsequent steps.

At step S104 and subsequent steps, as described above, control device 13 repeats fuel cut control for burning PM trapped in GPF 19 while performing exhaust temperature control for increasing the exhaust temperature.

Specifically, control device 13 controls the exhaust temperature before fuel cut control to match a target temperature set for each instance of fuel cut control, and gradually increases the target temperature each time fuel cut control is performed (see FIG. 8).

At step S104, the control device 13 determines a target value TFbtg of temperature TFb of GPF 19 before fuel cut control based on the information on deposition amount DA.

Based on the correlation between deposition amount DA and peak temperature TFp shown in FIG. 9, control device 13 sets target temperature TFbtg of GPF 19 before fuel cut control to a value near the highest temperature at which peak temperature TFp does not exceed melting loss temperature MT under the current deposition amount DA.

When fuel cut control is performed, peak temperature TFp changes according to deposition amount DA and temperature TFb of GPF 19 before regeneration control. Therefore, control device 13 decreases target temperature TFbtg as deposition amount DA increases.

Thus, control device 13 can burn and remove PM by fuel cut control to such an extent that the melting loss of GPF 19 does not occur, by controlling temperature TFb of GPF 19 before fuel cut control according to deposition amount DA.

Also, at step S104, instead of variably setting target value TFbtg of temperature TFb of GPF 19 before fuel cut control according to the current deposition amount DA, control device 13 may set target value TFbtg to a fixed value that is predetermined based on the number of iterations of fuel cut control and gradually increases as the number of iterations increases.

When target value TFbtg of temperature TFb is set to a fixed value, control device 13 at step S104 may predict peak temperature TFp to be achieved when fuel cut control is performed based on the correlation between deposition amount DA and peak temperature TFp shown in FIG. 9 and decrease the fuel cut time when predicted peak temperature TFp is greater than melting loss temperature MT.

In this case, control device 13 decreases the fuel cut time as deposition amount DA of particulate matter in GPF 19 increases when temperature TFb of GPF 19 before fuel cut control is constant and decreases the fuel cut time as temperature TFb of GPF 19 before fuel cut control increases when deposition amount DA of particulate matter in GPF 19 is constant.

After setting target temperature TFbtg of GPF 19 before fuel cut control at step S104, control device 13, at step S105, controls the exhaust temperature so that the actual temperature of GPF 19 comes close to target temperature TFbtg.

Control device 13 increases the exhaust temperature by performing at least one of lean combustion, post injection, and ignition timing retard and thereby increases the actual temperature of GPF 19 to target temperature TFbtg in the regeneration process.

After controlling temperature TFb of GPF 19 before fuel cut control to match target temperature TFbtg at step S105, control device 13 proceeds to step S106 to perform fuel cut control for burning PM trapped in GPF 19.

Next, at step S107, control device 13 determines whether the regeneration process of GPF 19, in other words, the removal by burning of PM, has been completed.

Control device 13 may determine that the regeneration process of GPF 19 has been completed based on the determination that the number of iterations of fuel cut control has reached a preset value.

Also, control device 13 may assume that deposition amount DA has decreased and the amount of PM to be burned and removed by fuel cut control has decreased when the amount of temperature change of GPF 19 (or an increase in second exhaust temperature TEX2) resulting from fuel cut control is less than a set value and thereby determine that the regeneration process of GPF 19 has been completed.

When it is determined that the regeneration process of GPF 19 has been completed, control device 13 ends this routine immediately after step S107 and stops the repetition of fuel cut control for filter regeneration.

On the other hand, when the regeneration process of GPF 19 has not been completed, control device 13 proceeds from step S107 to step S108 and performs a deposition state determination process including updating the estimate value of deposition amount DA and updating information indicating whether PM is deposited in central part 19a of GPF 19.

Next, at step S109, control device 13 determines whether the control timing for the next fuel cut control has arrived.

For example, control device 13 determines that the control timing for the next fuel cut control has arrived when a predetermined period of time passes after the previous fuel cut control.

That is, control device 13 can perform fuel cut control at predetermined time intervals.

The time interval of fuel cut control is not limited to a fixed period of time. For example, control device 13 may make the time interval between the first fuel cut control and the second fuel cut control differ from the time interval between the second fuel cut control and the third fuel cut control.

The control device 13 repeats step S108 (that is, the updating of deposition amount DA) until the control timing of the next fuel cut control arrives, and returns to step S104 when the control timing of the next fuel cut control arrives.

When returning to step S104 after performing the first fuel cut control, control device 13 sets target temperature TFbtg of GPF 19 before the second fuel cut control.

Because PM in central part 19a has been burned and removed by the first fuel cut control and exhaust gas passes through central part 19a in which the PM has been burned off and removed, PM remaining unburned in peripheral part 19b after the first fuel cut control is less likely to be burned.

For this reason, control device 13 makes it easier to burn the PM remaining unburned in peripheral part 19b by setting target temperature TFbtg of GPF 19 before fuel cut control at a value higher than that before the first fuel cut control.

When the second fuel cut control is performed, because the PM in central part 19a, through which exhaust gas passes, has been burned off and removed by the first fuel cut control, the melting loss area, which is determined by deposition amount DA and temperature TFb of GPF 19 before fuel cut control, is reduced to an area in which deposition amount DA is greater and the temperature of GPF 19 before fuel cut control is higher compared to the melting loss area applied to the first fuel cut control.

Therefore, control device 13 can make target temperature TFbtg of GPF 19 before the second fuel cut control higher than that before the first fuel cut control while preventing the occurrence of melting loss.

When temperature TFb of GPF 19 before the second fuel cut control is higher than that before the first fuel cut control, the PM remaining unburned in peripheral part 19b after the first fuel cut control is easier to burn off. Accordingly, control device 13 can burn off and remove the PM in peripheral part 19b by performing the second fuel cut control.

Figure 12:
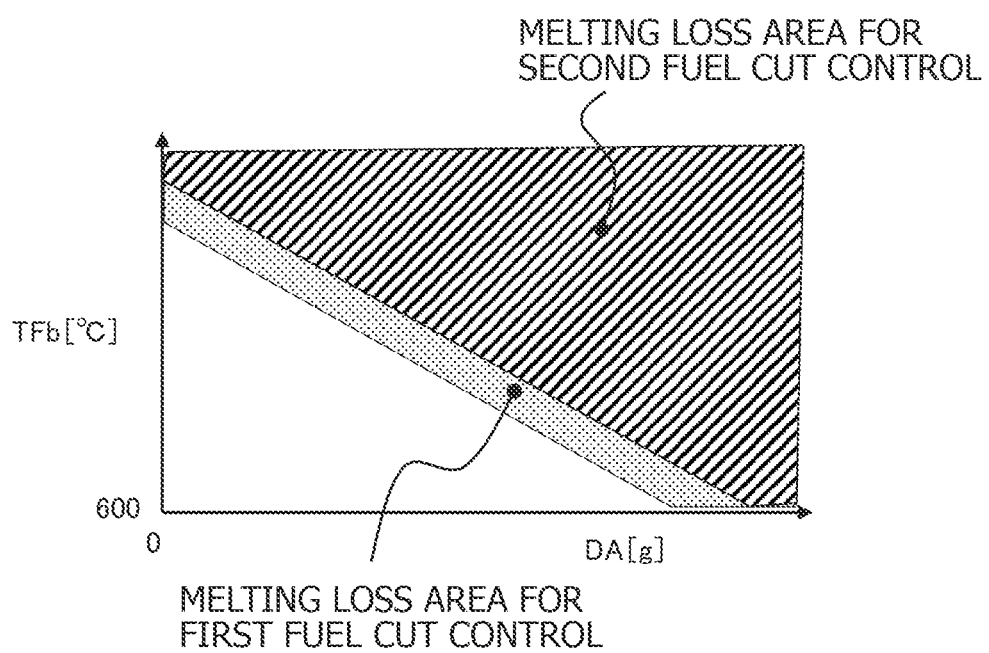
FIG. 12 is a diagram showing melting loss areas corresponding to combinations of deposition amounts and temperatures.

FIG. 12 shows a difference between a melting loss area (in other words, combinations of deposition amounts DA and temperatures TFb before fuel cut control with which the temperature is supposed to exceed the melting loss temperature) applied to the first fuel cut control and a melting loss area applied to the second fuel cut control.

FIG. 12 shows that the melting loss area shifts to an area in which deposition amount DA is greater and temperature TFb of GPF 19 before fuel cut control is higher, as the number of iterations of fuel cut control increases.

Thus, at step S104, control device 13 sets target temperature TFbtg of GPF 19 before the second fuel cut control to a value greater than that before first fuel cut control.

Next, at step S105, control device 13 increases the exhaust temperature by performing at least one of lean combustion, post injection, and ignition timing retard to increase temperature TFb of GPF 19 before the second fuel cut control up to target temperature TFbtg higher than that for the first fuel cut control.

Then, when temperature TFb of GPF 19 reaches target temperature TFbtg, control device 13 performs the second fuel cut control at step S106.

Next, when determining, at step S107, that the regeneration process has not been completed (for example, when the number of iterations of fuel cut control is less than a set number), control device 13 proceeds to step S108 and subsequent steps to perform the third fuel cut control in a state in which temperature TFb of GPF 19 before fuel cut control has been increased to a value higher than that for the second fuel cut control (in other words, the previous fuel cut control).

In the regeneration process of GPF 19, control device 13 can prevent PM from remaining unburned in peripheral part 19b of GPF 19 by repeating fuel cut control for burning PM while gradually increasing temperature TFb of GPF 19 (or the exhaust temperature) before fuel cut control.

Also, control device 13 can facilitate the burning of PM as much as possible while suppressing the occurrence of melting loss resulting from the burning of PM by increasing, based on the prediction of the increase in the temperature of GPF 19 resulting from fuel cut control, temperature TFb of GPF 19 (in other words, the exhaust temperature) before fuel cut control as much as possible within a range in which melting loss does not occur.

Figure 13:
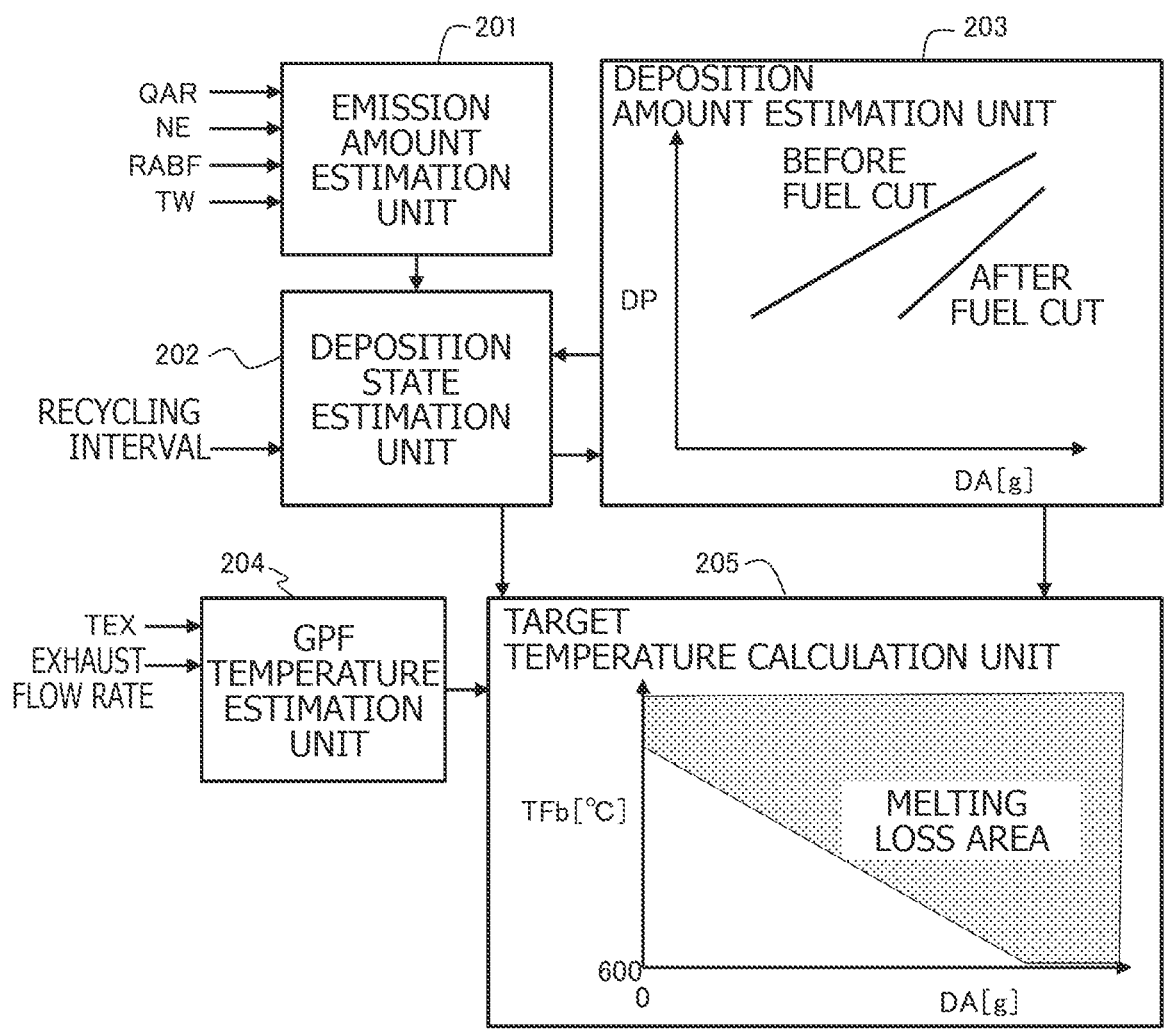
FIG. 13 is a block diagram illustrating a function for setting a target temperature of a GPF before fuel cut control.

FIG. 13 is a block diagram illustrating details of a function of control device 13 for setting target temperature TFbtg of GPF 19 before fuel cut control.

An emission amount estimation unit 201 acquires operating conditions of internal-combustion engine 1, such as intake airflow rate QAR, engine rotational speed NE, air-fuel ratio RABF, and water temperature TW, estimates the emission amount of PM from internal-combustion engine 1 based on the acquired information, and calculates a total estimated emission amount to obtain deposition amount DA.

A deposition state estimation unit 202 obtains information indicating whether fuel cut control for burning PM has been performed, and changes and sets the correlation between differential pressure DP and deposition amount DA based on whether fuel cut control has been performed.

Also, deposition state estimation unit 202 changes and sets the melting loss area defined by deposition amount DA and temperature TFb of GPF 19, in other words, the conditions related to deposition amount DA and temperature TFb with which the temperature is supposed to exceed the melting loss temperature as a result of fuel cut control, according to the degree of progress of the regeneration process (or the number of iterations of fuel cut control).

A deposition amount estimation unit 203 acquires setting information indicating the correlation between differential pressure DP and deposition amount DA (in other words, pressure loss sensitivity information) from deposition state estimation unit 202, and estimates deposition amount DA based on a detection value of differential pressure DP and the correlation between differential pressure DP and deposition amount DA that is set based on the acquired setting information.

A GPF temperature estimation unit 204 estimates a temperature TF of GPF 19 based on information on exhaust temperature TEX and information on an exhaust flow rate (which is approximately equal to intake airflow rate).

A target temperature calculation unit 205 obtains information on deposition amount DA, information on temperature TF of GPF 19, and information on the changed melting loss area, and calculates target value TFbtg of temperature TFb of GPF 19 before fuel cut control.

Target temperature calculation unit 205 shifts the melting loss area to an area corresponding to higher temperatures TFb and larger deposition amounts DA according to the degree of progress of the regeneration process (in other words, an increase in the number of iterations of fuel cut control and an expansion of the removal by burning of PM to peripheral part 19b).

Also, target temperature calculation unit 205 refers to the setting of the melting loss area indicating, for each deposition amount DA, a range of temperature TFb at which melting loss is supposed to occur and sets a target value close to the highest value of temperature TFb within a range in which melting loss is not expected to occur.

The technical ideas described in the above embodiment may be used in any appropriate combination as long as they do not conflict with each other.

Although the present invention is specifically described above with reference to a preferred embodiment, it is apparent to one skilled in the art that variations of the embodiment can be made based on the basic technical concept and the teachings of the present invention.

For example, when it is determined that PM in peripheral part 19b of GPF 19 has also been burned off and removed by the current regeneration process using fuel cut control, control device 13 may increase the interval between the current regeneration process and the next regeneration process.

Furthermore, the number of iterations of fuel cut control in a regeneration process and the setting of temperature TFb of GPF 19 before fuel cut control may be changed based on the shape and the volume of GPF 19.

REFERENCE SYMBOL LIST

1 . . . internal-combustion engine; 5 . . . fuel injection valve; 13 . . . control device; 19 . . . gasoline particulate filter (GPF)

The invention claimed is:

1. An internal-combustion engine control device for an internal-combustion engine fueled by gasoline and including a filter that traps particulate matter in exhaust gas
the internal-combustion engine control device including a processor and a memory,
the memory storing instructions which when executed by the processor, cause the processor to perform the steps of:
determining whether regeneration of the filter is required based on deposition amount of particulate matter trapped in the filter;
when regeneration of the filter is required, performing fuel cut control to temporarily stop supply of fuel to the internal-combustion engine to burn the particulate matter trapped in the filter and repeating the fuel cut control while performing exhaust temperature control for increasing a temperature of the exhaust gas of the internal-combustion engine;
in the exhaust temperature control, controlling the temperature of the exhaust gas before the fuel cut control to match a target temperature set for each instance of the fuel cut control and gradually increasing the target temperature each time the fuel cut control is performed; and
estimating the deposition amount based on information on a differential pressure before and after the filter such that the deposition amount estimated after first fuel cut control is greater than the deposition amount estimated before the first fuel cut control when the differential pressure is constant.

2. An internal-combustion engine control device for an internal-combustion engine fueled by gasoline and including a filter that traps particulate matter in exhaust gas
the internal-combustion engine control device including a processor and a memory, the memory storing instructions which when executed by the processor, cause the processor to perform the steps of:
determining whether regeneration of the filter is required based on deposition amount of trapped in the filter;
when regeneration of the filter is required, performing fuel cut control to temporarily stop supply of fuel to the internal-combustion engine to burn the particulate matter trapped in the filter and repeating the fuel cut control while performing exhaust temperature control for increasing a temperature of the exhaust gas of the internal-combustion engine;
decreasing a period of time for which a supply of fuel to the internal-combustion engine is stopped in the fuel cut control as a deposition amount of particulate matter in the filter increases when a temperature of the filter before the fuel cut control is constant and decreasing the period of time as the temperature of the filter before the fuel cut control increases when the deposition amount of the particulate matter in the filter is constant; and estimating the deposition amount based on information on a differential pressure before and after the filter such that the deposition amount estimated after first fuel cut control is greater than the deposition amount estimated before the first fuel cut control when the differential pressure is constant.

3. A filter regeneration method for regenerating a filter that is provided in an exhaust path of an internal-combustion engine fueled by gasoline and traps particulate matter in exhaust gas of the internal-combustion engine, the filter regeneration method comprising:

determining whether regeneration of the filter is required based on deposition amount of particulate matter trapped in the filter;

when regeneration of the filter is required, performing fuel cut control to temporarily stop supply of fuel to the internal-combustion engine to burn the particulate matter trapped in the filter and repeating the fuel cut control while performing exhaust temperature control for increasing a temperature of the exhaust gas of the internal-combustion engine;

in the exhaust temperature control, controlling the temperature of the exhaust gas before the fuel cut control to match a target temperature set for each instance of the fuel cut control and gradually increasing the target temperature each time the fuel cut control is performed; and estimating the deposition amount based on information on a differential pressure before and after the filter such that the deposition amount estimated after first fuel cut control is greater than the deposition amount estimated before the first fuel cut control when the differential pressure is constant.

\* \* \* \* \*